(12) United States Patent
Derrien et al.

(10) Patent No.: US 9,044,883 B2
(45) Date of Patent: Jun. 2, 2015

(54) METHOD FOR MAKING CONTAINERS COMPRISING AN INTERMEDIATE DEPRESSURING OPERATION

(75) Inventors: Mikael Derrien, Octeville sur mer (FR); Pierrick Protais, Octeville sur mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 580 days.

(21) Appl. No.: 12/679,642

(22) PCT Filed: Sep. 24, 2008

(86) PCT No.: PCT/FR2008/001326
§ 371 (c)(1),
(2), (4) Date: Jun. 21, 2010

(87) PCT Pub. No.: WO2009/074738
PCT Pub. Date: Jun. 18, 2009

(65) Prior Publication Data
US 2010/0276849 A1 Nov. 4, 2010

(30) Foreign Application Priority Data
Sep. 24, 2007 (FR) ...................... 07 06670

(51) Int. Cl.
*B29C 43/22* (2006.01)
*B29C 49/18* (2006.01)
*B29C 49/16* (2006.01)
(Continued)

(52) U.S. Cl.
CPC ................. *B29C 49/18* (2013.01); *B29C 49/16* (2013.01); *B29C 49/66* (2013.01); *B29C 49/783* (2013.01); *B29C 2035/1633* (2013.01); *B29K 2067/00* (2013.01)

(58) Field of Classification Search
CPC ............... B29C 2049/6607; B29C 2049/6615; B29C 2049/6623; B29C 2049/663; B29C 2049/6646
USPC ................. 264/526, 454, 37.14, 37.16, 37.25, 264/37.31, 917, 632, 512, 520, 523, 171.12, 264/171.26, 177.14, 209.1
See application file for complete search history.

(56) References Cited

U.S. PATENT DOCUMENTS 5,035,931 A * 7/1991 Yamada et al. ............... 428/35.7
5,145,632 A 9/1992 Denis et al.
(Continued)

FOREIGN PATENT DOCUMENTS

DE        199 34 320 A1    1/2001
DE   10 2004 014 653 A1   10/2005
(Continued)

*Primary Examiner* — Stella Yi
(74) *Attorney, Agent, or Firm* — Sughrue Mion, PLLC

(57) ABSTRACT

Process for manufacturing a container (2) from a plastic preform (3) by blow-molding in a mold (11), comprising:
  an operation of introducing the preform (3) into the mold (11);
  a blow-molding operation consisting of pressurizing the preform (3) by introducing a gas under a blow-molding pressure into it;
  a flushing operation subsequent to the blow-molding operation consisting of partially pressurizing the container (2) by introducing a gas under a flushing pressure lower than the blow-molding pressure into it;
  an operation of at least partial depressurization of the container down to a pressure lower than the flushing pressure, wherein this depressurization operation is subsequent to the blow-molding operation and prior to the flushing operation.

6 Claims, 5 Drawing Sheets

(51) Int. Cl.
*B29C 49/66* (2006.01)
*B29C 49/78* (2006.01)
*B29C 35/16* (2006.01)
*B29K 67/00* (2006.01)

(56) References Cited

U.S. PATENT DOCUMENTS 5,213,734 A 5/1993 Masson et al.
5,730,914 A * 3/1998 Ruppman, Sr. ............... 264/28
2004/0173949 A1 9/2004 Storione et al.
2008/0164642 A1 7/2008 Hirdina

FOREIGN PATENT DOCUMENTS

| | | |
|---|---|---|
| EP | 0 406 146 A1 | 1/1991 |
| FR | 2 827 541 A1 | 1/2003 |
| JP | 0 500166 A1 | 8/1992 |

* cited by examiner

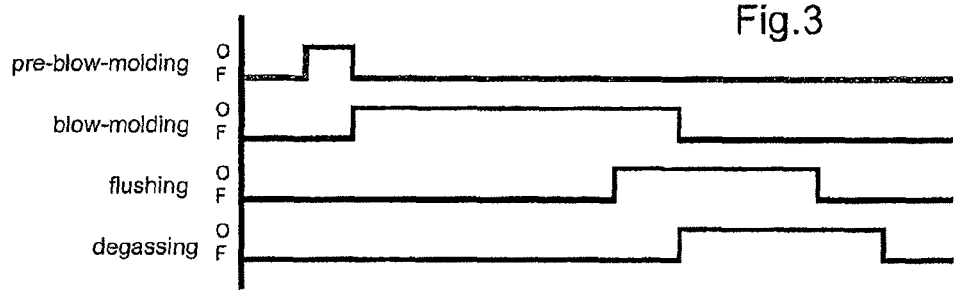
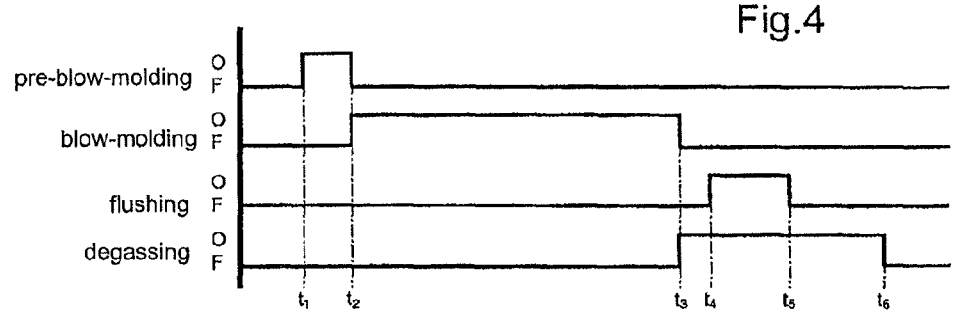
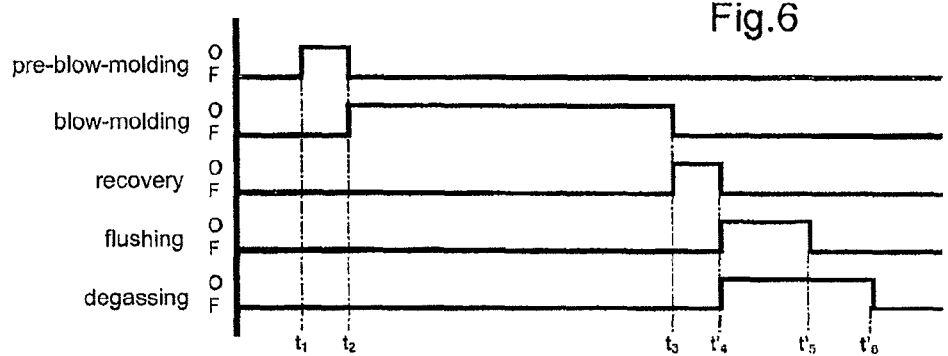

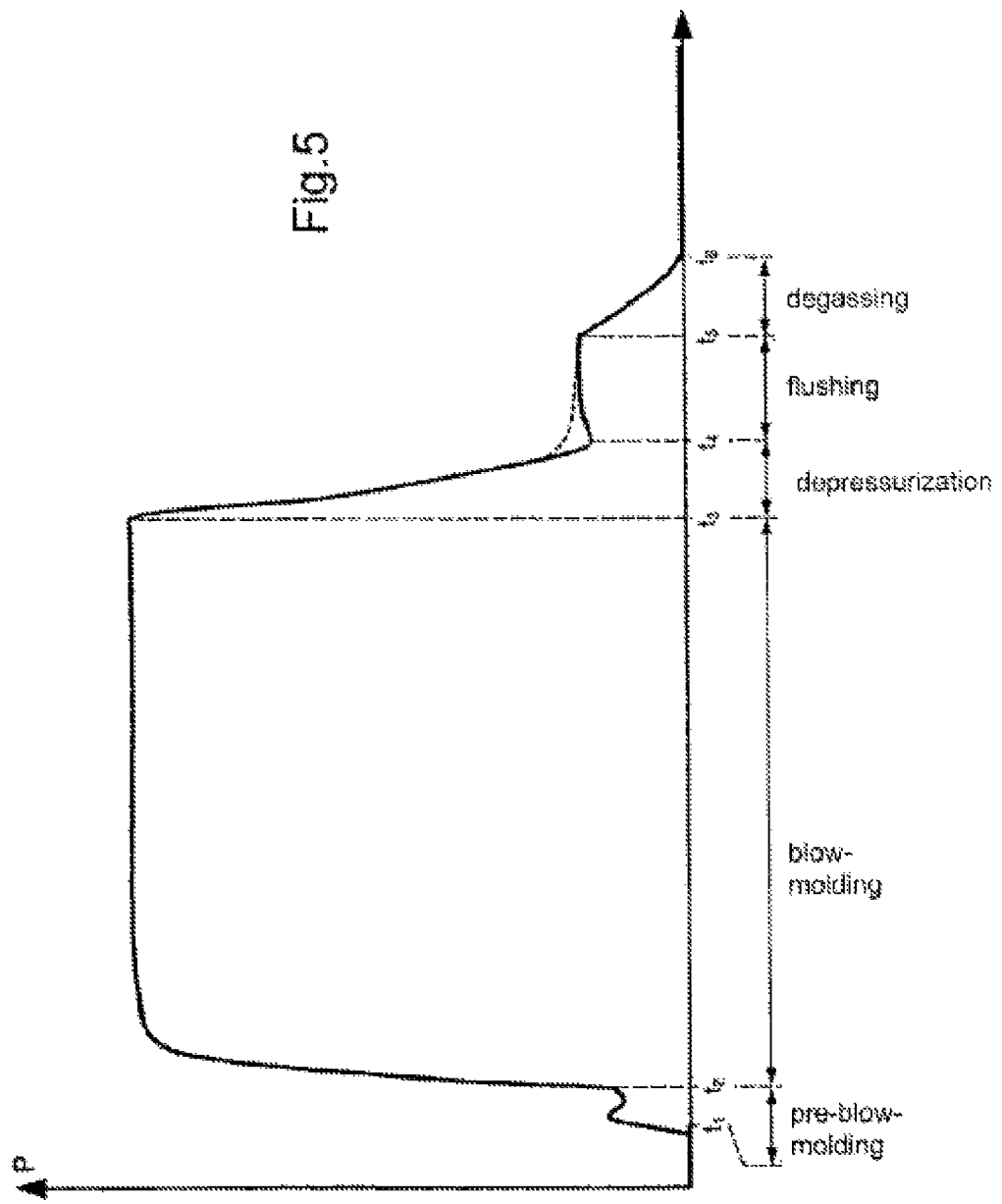

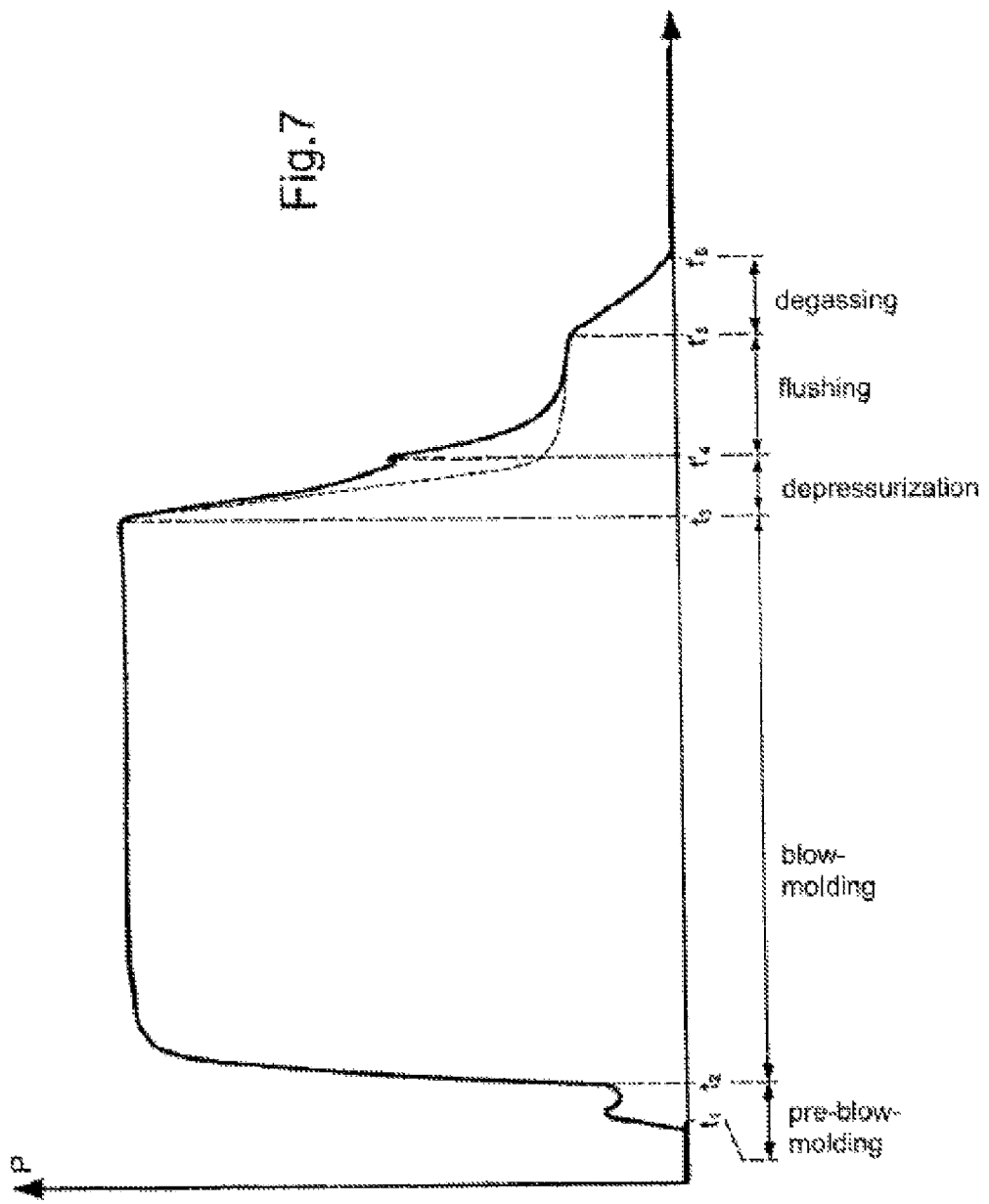

METHOD FOR MAKING CONTAINERS COMPRISING AN INTERMEDIATE DEPRESSURING OPERATION

The invention relates to the manufacture of containers from preforms made of plastic such as PET by blow-molding or by extrusion blow-molding.

To manufacture a container by the blow-molding technique, a preform (which is either the preform itself or an intermediate container formed from a preform by a first blow-molding operation) is first heated to a temperature greater than the glass transition temperature of the constituent material of the preform.

Next the preform is introduced into a mold, then the blow-molding is carried out by injecting a gas (generally air) under high pressure (greater than 20 bars, and generally greater than 34 bars) into it. Besides blow-molding, the extrusion blow-molding technique consists of extruding the preform by means of a sliding rod, notably in order to minimize the offset of the container and to distribute the material as uniformly as possible.

To obtain heat resistant (HR) containers during a hot filling, provision can also be made for heating the wall of the mold, wherein the container is temporarily kept in contact with the wall thus heated after blow-molding, which increases its crystallinity by thermal means.

Once the blow-molding is completed, the container undergoes a degassing operation consisting of depressurizing the container by placing it in the atmosphere. In order to cool the inside wall of the container more effectively in such as way as to rigidify it faster, as a general rule provision is made, prior to the degassing operation, of a flushing operation consisting of introducing a gas under a pressure lower than the blow-molding pressure into the container, with the container placed in the atmosphere so as to induce the gas (under a pressure of around 15 bars) to circulate, which is conducive to a more rapid drop in the temperature.

This proven manufacturing technique (illustrated in the timing chart of FIG. 3 and in dotted lines on the curves of FIGS. 5 and 7), which is in widespread use particularly in the bottling industry, has arrived at maturity. Nevertheless the inventors wished to perfect it.

To this end is proposed a process for manufacturing a container from a plastic preform by blow-molding in a mold, which comprises:
- an operation of introducing the preform in the mold;
- a blow-molding operation consisting of pressurizing the preform by introducing a gas under a blow-molding pressure into it;
- a flushing operation subsequent to the blow-molding operation, consisting of partially pressurizing the container by introducing a gas under a flushing pressure lower than the blow-molding pressure into it;
- an operation of at least partial depressurization of the container subsequent to the blow-molding operation and initiated prior to the flushing operation.

Other objects and advantages of the invention will emerge more clearly from the following description, which refers to the appended drawings, in which:

FIG. 3 is a timing chart illustrating the sequence of operations carried out for manufacturing a container according to a standard process;

FIG. 4 is a timing chart illustrating the sequence of operations carried out for manufacturing a container according to a first embodiment of the process of the invention;

FIG. 5 is a diagram on which are plotted two curves illustrating the variations in the pressure residing in a preform during the manufacturing of a container, wherein the solid curve corresponds to a process of the invention such as illustrated in FIG. 4 and the dotted curve corresponds to a standard process;

FIG. 6 is a timing chart illustrating a sequence of operations carried out for manufacturing a container according to a second embodiment of the process of the invention;

FIG. 7 is a diagram on which are plotted two curves illustrating the variations in the pressure residing in a preform during the manufacturing a container, wherein the solid curve corresponds to a process of the invention such as illustrated in FIG. 6 and the dotted curve corresponds to a standard process.

Figure 1:
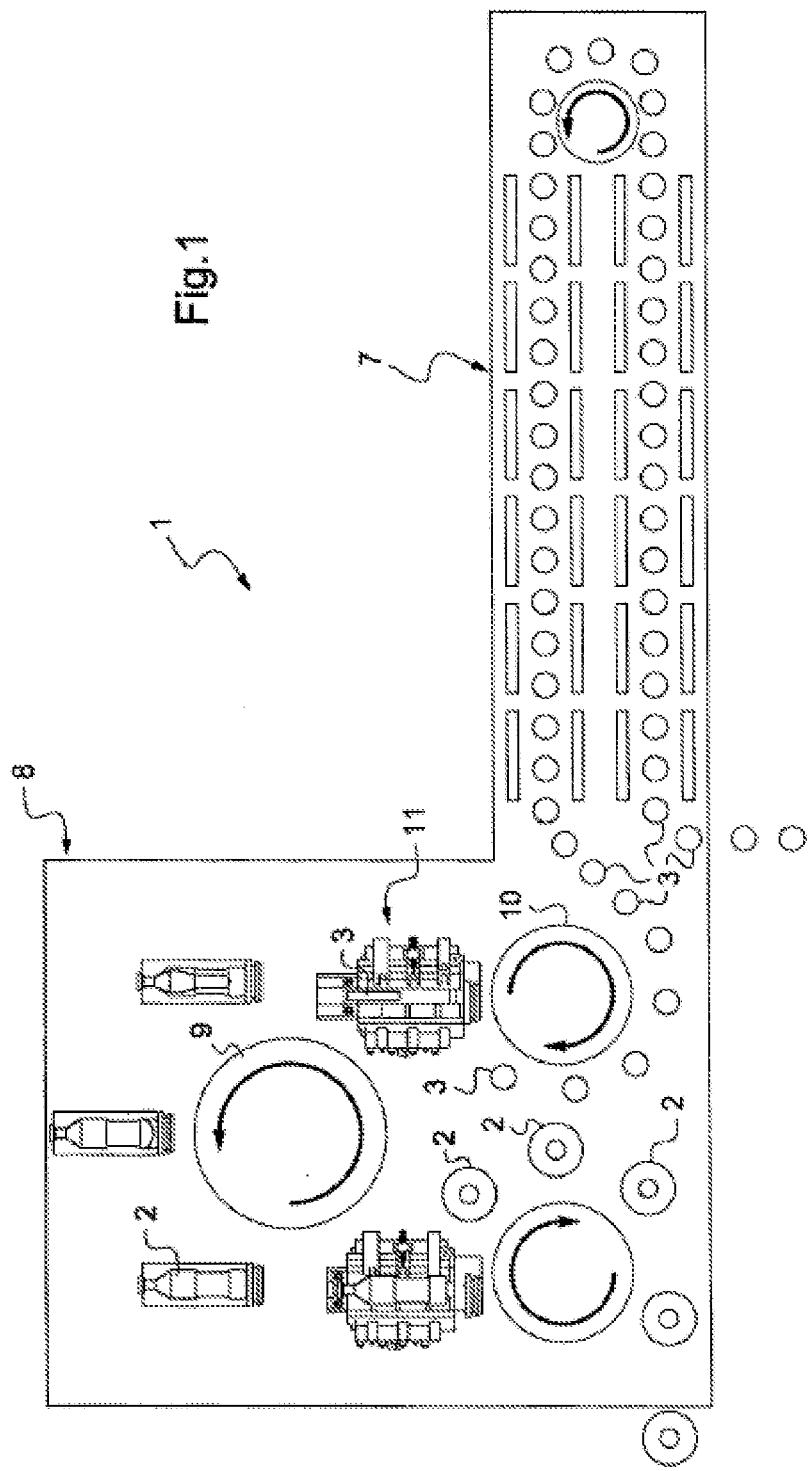
FIG. 1 is a diagrammatic view showing a machine for manufacturing containers.

FIG. 1 illustrates a machine 1 for manufacturing containers 2 from preforms 3 made of plastic such as PET (polyethylene terephthalate). According to a preferred embodiment, the preforms 3 are preforms from which the final containers 2 are directly obtained without first forming an intermediate container. Each preform 3 comprises a neck 4 (which is not subjected to deformation during the forming of the container 2) and a cylindrical body 5 with a bottom 6 shaped like a hemispherical cap.

This machine 1 comprises a tunnel oven 7 in which the preforms 3 are sequentially heated to a temperature greater than the glass transition temperature of their constituent material. For PET, of which the glass transition temperature is around 70° C., preference is given to a heating temperature in the range of between 100° C. and 140° C.

The machine 1 further comprises a plurality of molding units 8 mounted on a rotating carrousel 9 arranged at the outlet of the oven 7 with interposition of a transfer wheel 10 ensuring that the heating and molding operations of the preforms 3 are synchronized.

Each molding unit 8 comprises a steel or aluminum alloy mold 11 consisting of two half-molds 12, 13 and a mold bottom 14, which together define an inner cavity 15 designed to receive a preform 3 from the oven 7.

Each molding unit 8 further comprises:
- a stretch rod 16 slidably mounted relative to the mold 11 along a main axis X (generally an axis of revolution) of the mold, between an up position (FIG. 2) allowing the introduction of the preform 3 and a down position in which, at the end of the extrusion of the preform 3, the rod 16 reaches the bottom of the mold 14, pressing the bottom 6 of the preform 3 against it,
- a housing 17 defining a nozzle 18 in which the rod 16 slides and which, during the manufacture of the container 2, cooperates with the neck 4 of the preform 3.

The molding unit 8 further comprises a plurality of fluid circuits opening into the nozzle 18 via the housing 17, namely:
- a circuit 19 for medium pressure (from 5 to 16 bars) pre-blow-molding air, this circuit 19 comprising a source 20 of pre-blow-molding air and a pipe 21 (which can be at least partially formed in the housing 17) connecting this source 20 to the nozzle 18 with interposition of a first, pre-blow-molding electrovalve 22;
- a circuit 23 for high pressure (between 34 and 39 bars) blow-molding air, comprising a source 24 of blow-molding air and a pipe 25 (which can be at least partially formed in the housing 17) connecting this source 24 to the nozzle 18 with interposition of a second, blow-molding electrovalve 26;

a flushing circuit 27 comprising a source 28 of medium-high pressure (between 15 and 20 bars) flushing air and a pipe 29 (which can be at least partially formed in the housing 17) connecting this source 28 to the nozzle 18 with interposition of a third, flushing electrovalve 30;

a degassing circuit 31 comprising an evacuation opening 32 leading to the atmosphere and a pipe 33 connecting the nozzle 18 to this opening 32 with interposition of a fourth, degassing electrovalve 34;

an air recovery circuit 35 comprising a pipe 36 connecting the nozzle 18 to the pre-blow-molding circuit 19 (more precisely to the pre-blow-molding air source 20) with interposition of a fifth, recuperation electrovalve 37 and a pressure regulator 38. Alternately, the air recovery circuit 35 can connect the nozzle 18 to a compressed air circuit employed for other applications, such as supplying actuating cylinders (particularly the actuating cylinders of the stretch rods 16 of the machine 1) with compressed air.

The electrovalves 22, 26, 30, 34, 37 and the pressure regulator 38 are electrically connected to a control unit 39 that controls their opening and closing (while taking their response times into account, as we shall see in the following).

The process for manufacturing a container 2 from a preform 3 shall now be described with reference to FIGS. 4 through 7. In FIGS. 4 and 7 are plotted timing charts illustrating different stages of the process and showing the status (O=open; F=closed) of the electrovalves controlling the pre-blow-molding (PRES.), the blow-molding (SOUF.), the flushing (BALAY.), the degassing (DEGAZ.), and, as shown in FIG. 6, the recovery (RECUP.). [Note: the abbreviations correspond to the original French language terms.]

The preform 3, mounted on a conveyor, is first introduced in the oven 7 where it is sequentially heated (generally with the neck 4 down). Upon exiting the oven 7, the preform 3 is grasped by a grip on the transfer wheel 10 and introduced, after being reoriented with the neck 4 up, in a previously-opened mold 11. In this position, the nozzle 18 and the stretch rod 16 are in the up position.

Once the mold 11 is closed, the joint descent of the nozzle 18, which will cap and seal the mold 11, and the stretch rod 16 into the molding cavity 15 begins, while the control unit 39, at a time $t_1$, orders the opening of the pre-blow-molding electrovalve 22 in order to establish communication between the inside of the preform 3 with the pre-blow-forming air source 20 and to introduce air under the pre-blow-forming pressure into the preform 3.

After the stretch rod 16 reaches the bottom 14 of the mold 11, the control unit 39 orders, at a time $t_2$, the closing of the pre-blow-molding electrovalve 22 and, simultaneously, the opening of the blow-molding electrovalve 26 (possibly allowing a delay prior to the response time of the electrovalves 22 and 26 so that the closing of one essentially corresponds to the opening of the other), in order to establish communication between the inside of the preform 3 and the blow-molding air source 24 and to pressurize the preform 3 by introducing air at the blow-molding pressure greater than the pre-blow-molding pressure into it.

Figure 2:
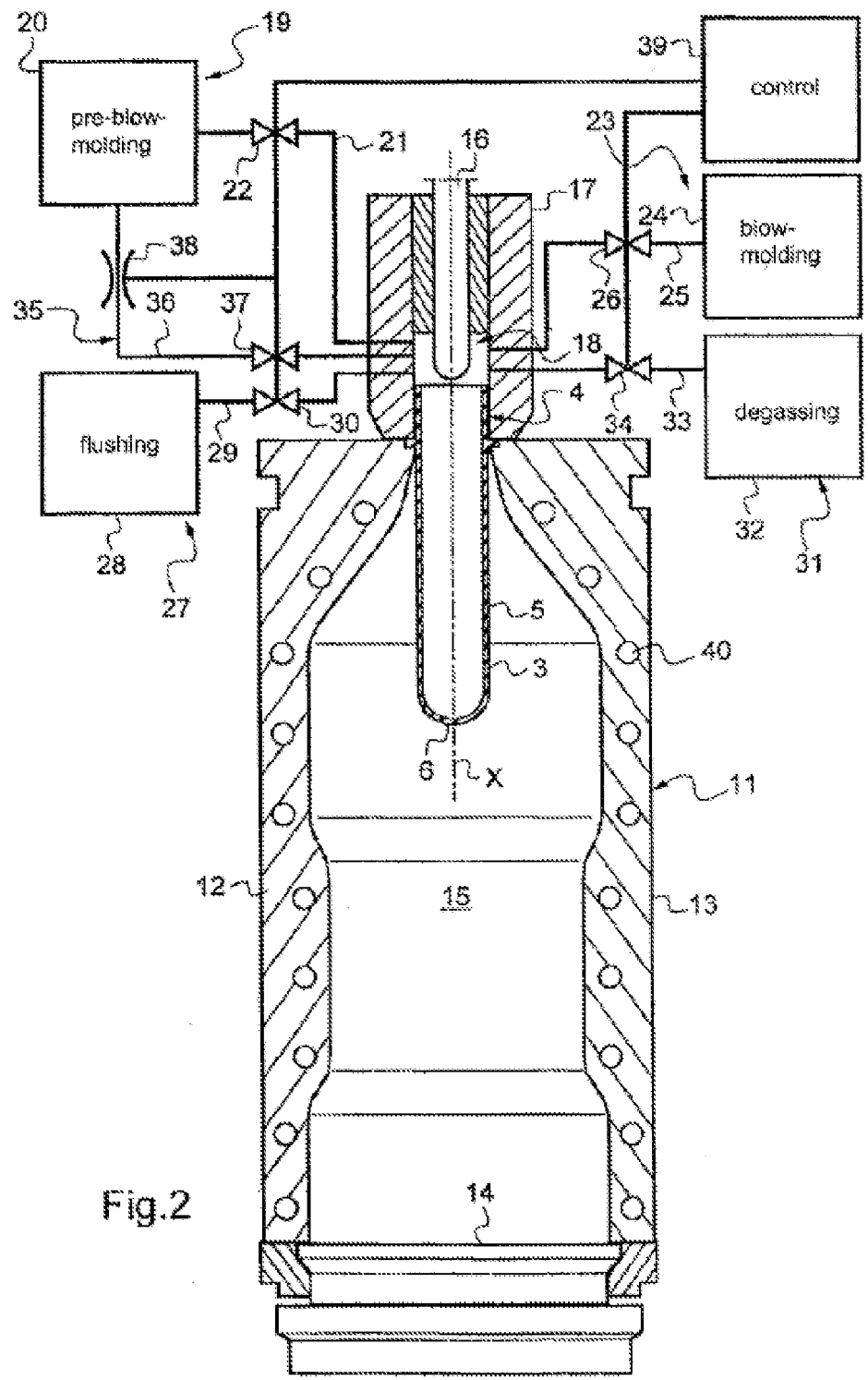
FIG. 2 is a diagrammatic cross-sectional view partially showing a molding unit inside the machine of FIG. 1.

The pressure residing in the preform 3 rapidly attains the blow-molding pressure, whereas the preform undergoes radial expansion until it reaches the wall of the mold 11, which, as shown in FIG. 2, is equipped with a heating circuit 40 comprising lines through which circulates a liquid (such as oil or water) kept at a high (i.e., greater than ca. 90° C.) temperature in the range of between 90° C. and 160° C.

Once the preform reaches the wall of the mold 11, the pressure in the preform remains appreciably constant (equal to the blow-molding pressure), with the blow-molding electrovalve 26 remaining open for a few tenths of a second in order to keep the preform 3 pressed against the wall of the mold 11. The container 2 thus formed is subjected to a heating of its outer wall (the one in contact with the mold 11), which increases its crystallinity and makes it more resistant to retraction during a hot filling (this type of container is known as a heat resistant (HR) container).

According to a first embodiment illustrated in FIGS. 4 and 5, the control unit 39 orders, at a time $t_3$, the closing of the blow-molding electrovalve 26, while ordering the opening of the degassing electrovalve 34 (possibly allowing a delay prior to the response time of the latter) in order to establish communication between the inside of the container 2 and the evacuation opening 32 leading to the atmosphere.

The pressure residing in the container 2 drops abruptly from the blow-molding pressure until it reaches a value in the vicinity of the pre-blow-molding pressure (FIG. 5) and lower than the flushing pressure.

This partial depressurization of the container 2 is accompanied by an abrupt release of the air present therein and a concomitant drop in temperature, which ensures rapid cooling of the inner wall of the container 2.

After a predetermined time period in the range of between 0.01 seconds and 0.03 seconds, and preferably between 0.05 and 0.30 seconds, the control unit 39 orders, at a time $t_4$, the opening of the flushing electrovalve 30 (with the degassing electrovalve 34 kept open) in order to insufflate air at the flushing pressure into the container and to cause it to circulate therein, which contributes to the cooling of the inner wall of the container 2 while keeping the container, under a specific pressure, in contact with the wall of the mold 11.

At a predetermined time $t_5$, the control unit 39 orders the closing of the flushing electrovalve 30, while keeping the degassing electrovalve 37 open. All of the residual air is hence evacuated to the atmosphere via the opening 32.

Once the pressure residing in the container 2 reaches atmospheric pressure, the control unit then orders the closing of the degassing electrovalve 37.

The standard subsequent operations consist of removing the container 2 from its mold 11 and loading the next preform 3.

Hence the manufacture of the container according to this first embodiment can be summarized by the sequence of the following successive operations:

$t_1$-$t_2$: pre-blow-molding
$t_2$-$t_3$: blow-molding
$t_3$-$t_4$: (at least partial) depressurization
$t_4$-$t_5$: flushing
$t_5$-$t_6$: degassing We have seen that this sequence has the advantage of speeding up the cooling of the inner wall of the container 2 thanks to the depressurization operation, which permits a rapid release of the air present in the container 2 from the blow-molding process.

According to a second embodiment illustrated in FIGS. 6 and 7, the control unit, at the time $t_3$, orders the closing of the blow-molding electrovalve 26 while ordering the opening of the recovery electrovalve 37 (possibly allowing a delay prior to the response time of the latter), in order to establish communication between the inside of the container 2 and the pre-blow-molding air circuit 19 via the pressure regulator 38, thus at least partially depressurizing the preform 3.

The pressure residing in the container 2 abruptly drops from the blow-molding pressure until it reaches a pre-determined constant value judged sufficient for enabling the recovery and recycling of the compressed air.

After a pre-determined period of time in the range of between 0.01 seconds and 0.20 seconds, and preferably between 0.05 seconds and 0.20 seconds, the control unit 39 orders, at a time $t'_4$, the closing of the recovery electrovalve 37 and the simultaneous opening of the flushing electrovalve 30 and the degassing electrovalve 37, in order to insufflate air at the flushing pressure into the container 2 and to cause it to circulate therein so as to speed up the cooling of the inner wall of the container 2.

At a time $t'_5$, the control unit 39 orders the closing of the flushing electrovalve 30, while the degassing electrovalve 37 is kept open. All of the residual air is thus evacuated to the atmosphere via the opening 32.

Once the pressure residing in the container 2 reaches atmospheric pressure, the control unit then orders the closing of the degassing electrovalve 37 at a time $t'_6$.

The standard subsequent operations consist of removing the container 2 from its mold 11 and loading the next preform 3.

Hence the manufacture of the container according to this second embodiment can be summarized by the sequence of the following successive operations:

$t_1$-$t_2$: pre-blow-molding
$t_2$-$t_3$: blow-molding
$t_3$-$t'_4$: depressurization/recovery
$t'_4$-$t'_5$: flushing
$t'_5$-$t'_6$: degassing This sequence makes it possible to recycle, notably as pre-blow-molding air, a portion of the air from the blow-molding thanks to the depressurization/recovery operation by which the air present in the container 2 at the end of the blow-molding is recovered, via the recovery electrovalve 37, in the pre-blow-molding air circuit 20.

This reduces the consumption of air under pressure, as a portion of the pre-blow-molding air (and possibly of the compressed air used in other applications necessary for the functioning of the machine 1) is provided from the recycling of the air under pressure contained in the container at the time of its manufacture.

The invention claimed is:

1. A process for manufacturing a container from a plastic preform by blow-molding in a mold, which comprises:
    an operation of introducing the plastic preform into the mold;
    a blow-molding operation comprising pressurizing the plastic preform by introducing a gas under a blow-molding pressure into the plastic preform;
    subsequent to the blow-molding operation, an operation of partial depressurization of the container comprising an at least partial recovery of evacuated gas by opening and closing of a recovery valve;
    after opening and closing of the recovery valve, a flushing operation comprising partially pressurizing the container resulting from the blow-molding operation by introducing a gas under a flushing pressure lower than the blow-molding pressure into the container; and
    a degassing operation;
    the flushing operation and the degassing operation being launched simultaneously by opening of a valve introducing the gas at the flushing pressure and the opening of a valve for degassing.

2. The process as in claim 1, comprising a pre-blow-molding operation comprising pressurizing the plastic preform by introducing a gas under a pre-blow-molding pressure lower than the blow-molding pressure into the plastic preform, and at least a portion of the gas recovered during partial depressurization is recovered as pre-blow-molding gas.

3. The process as in claim 1, wherein the blow-molding pressure is greater than or equal to 20 bars.

4. The process as in claim 1, wherein the flushing pressure is in the range of between 15 and 20 bars.

5. The process as in claim 1, wherein the mold is kept at a high temperature for manufacture of heat resistant containers.

6. The process as in claim 5, wherein the mold is kept at a temperature in a range of between 90° C. and 160° C.

\* \* \* \* \*